// United States Patent [15] 3,646,517
Waters et al. [45] Feb. 29, 1972

[54] ERROR DETECTION AND CORRECTION SYSTEM

[72] Inventors: Derek Brian Waters, Chelmsford; Anthony Jessop, Enfield, both of England

[73] Assignee: International Standard Electric Corporation, New York, N.Y.

[22] Filed: May 15, 1970

[21] Appl. No.: 37,718

[30] Foreign Application Priority Data

June 25, 1969 Great Britain ....................32,092/69

[52] U.S. Cl. ....................340/146.1, 178/69 D, 325/41, 340/347 DD

[51] Int. Cl. ....................G08c 25/00

[58] Field of Search ....................340/146.1, 347 DD, 349; 178/69, DIG. 6, 23.1; 325/41

[56] References Cited

UNITED STATES PATENTS 2,996,578 8/1961 Andrews, Jr. ....................178/69 X
3,369,229 2/1968 Dorros ....................340/347
3,405,235 10/1968 Carter ....................178/69
3,521,274 7/1970 Sawai ....................340/347 X

*Primary Examiner*—Charles E. Atkinson
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

This relates to an error detection and correction system for use in the receive terminal of a restricted disparity ternary code communication system. A word disparity counter and sequence detector detects sequences of consecutive ternary code groups which should contain predetermined disparity characteristics. A differential counter computes the expected disparity characteristics of such sequences. The detected and expected disparity characteristics are compared and any differences therebetween adjusts the counter to compensate for the difference. An error rate detector also responds to the difference to provide an error signal when a predetermined number of the differences occur in a given time interval. The error signal indicates an out-of-synchronism condition and is employed to regain synchronism.

10 Claims, 9 Drawing Figures

Inventors
DEREK B. WATERS
ANTHONY JESSOP
By Alfred C. Hill
Agent

Inventors
DEREK B. WATERS
ANTHONY JESSOP
By Alfred C. Hill
Agent

Inventors
DEREK B. WATERS
ANTHONY JESSOP
By Alfred C. Hill
Agent

Inventors
DEREK B. WATERS
ANTHONY JESSOP
By Alfred C. Hill
Agent

Inventors
DEREK B. WATERS
ANTHONY JESSOP
By Alfred C. Hill
Agent

Inventors
DEREK B. WATERS
ANTHONY JESSOP
By Alfred C. Hill
Agent

Inventors
DEREK B. WATERS
ANTHONY JESSOP
By Alfred C. Hill
Agent

ERROR DETECTION AND CORRECTION SYSTEM

BACKGROUND OF THE INVENTION

This invention relates to digital code translators, and more particularly to an error detection and correction system for employment in such translators.

The term "restricted disparity ternary code" is used to denote a ternary code in which only zero or positive disparity code combinations are used initially and in which some of the positive disparity code combinations are subsequently replaced by their inverse for the purpose of keeping the accumulated disparity of the digits sent to the line to a minimum. At the receive terminal the incoming ternary stream is broken up into three-digit words and when translating the ternary code to a binary code equivalent positive and negative disparity words are given identical outputs. A system of the above type is fully disclosed in the copending application of D.B. Waters, Ser. No. 776,062, filed Nov. 15, 1968.

SUMMARY OF THE INVENTION

An object of the present invention is to provide an error detection and correction system for employment with a restricted disparity ternary code signal translator to detect and correct both digit errors and out-of-synchronism conditions.

A feature of the present invention is the provision in a restricted disparity ternary code signal translator of an error detection and correction system comprising a source of a stream of the ternary code signals; first means coupled to the source for detecting in the stream sequences of consecutive ternary code groups which should contain predetermined disparity characteristics; second means coupled to the source for computing the expected disparity characteristics of the sequences; third means coupled to the first and second means for comparing the detected disparity characteristic with the expected disparity characteristics and producing a control signal in response to a difference between the detected and the expected disparity characteristics to adjust the second means to compensate for the difference; and fourth means coupled to the third means responsive to the control signal to produce an error signal.

Another feature of the present invention is the provision of a fifth means coupled to the above-mentioned fourth means responsive to a predetermined number of the error signals within a predetermined time interval to detect an out-of-synchronism condition and produce a correction signal.

A further feature of the present invention is the provision of a timing signal generator coupled to the above-mentioned source and the above-mentioned fifth means to control the operation of the above-mentioned translator, the timing signal generator being responsive to the correction signal to adjust the operation of the timing signal generator to achieve synchronism.

BRIEF DESCRIPTION OF THE DRAWING

The above-mentioned and other features and objects of this invention will become more apparent by reference to the following description taken in conjunction with the accompanying drawings, in which.

DESCRIPTION OF THE PREFERRED EMBODIMENT

The type of ternary code which we are considering arises out of the need to reduce the accumulated disparity of the digits sent to line in a PCM (pulse code modulation) system. Normally, the PCM equipment operates with binary digital codes. To reduce the accumulated disparity of four-bit binary codes they are translated into three-bit ternary codes of zero or positive disparity. A count is kept of the accumulated disparity of the ternary digits sent to line and when this count becomes excessive, i.e., when it becomes +1 and a further positive disparity word is due to be transmitted this latter word is inverted, thus, making it a negative disparity word. Zero disparity words are not affected by this process.

At the receive terminal, a reversible counter is driven by the received + and − digits. Although the accumulated disparity is the sum of all the previous word disparities, there are certain short sequences which, when received, enable the correct state of this counter to be determined. Table 1 shows the possible magnitude and sign of the accumulated disparity on the line when the disparity of two consecutive nonzero disparity words are known, assuming the ternary words are correctly framed. The interposing of zero disparity words between nonzero disparity words does not affect Table 1. It should be noted that + and − in Table 1 may be interchanged.

TABLE I

| First non-zero Disparity Word | Next non-zero Disparity Word | Predictable states of Tx Differential Counter |
|---|---|---|
| +1 | +3 | +2, +3 |
| | +2 | +1, +2 |
| | +1 | −1, +1 |
| | −1 | −1 |
| | −2 | −2 |
| | −3 | −3 |
| +2 | +3 | +3 |
| | +2 | +2 |
| | +1 | +1 |
| | −1 | −1, +1 |
| | −2 | −2, −1 |
| | −3 | −3, −2 |
| +3 | +3 | * |
| | +2 | * |
| | +1 | * |
| | −1 | −1, +1, +2 |
| | −2 | −2, −1, +1 |
| | −3 | −3, −2, −1 |

Note: Sequences with states marked * cannot occur with words correctly framed.

Figures 1A, 1B, 1C:
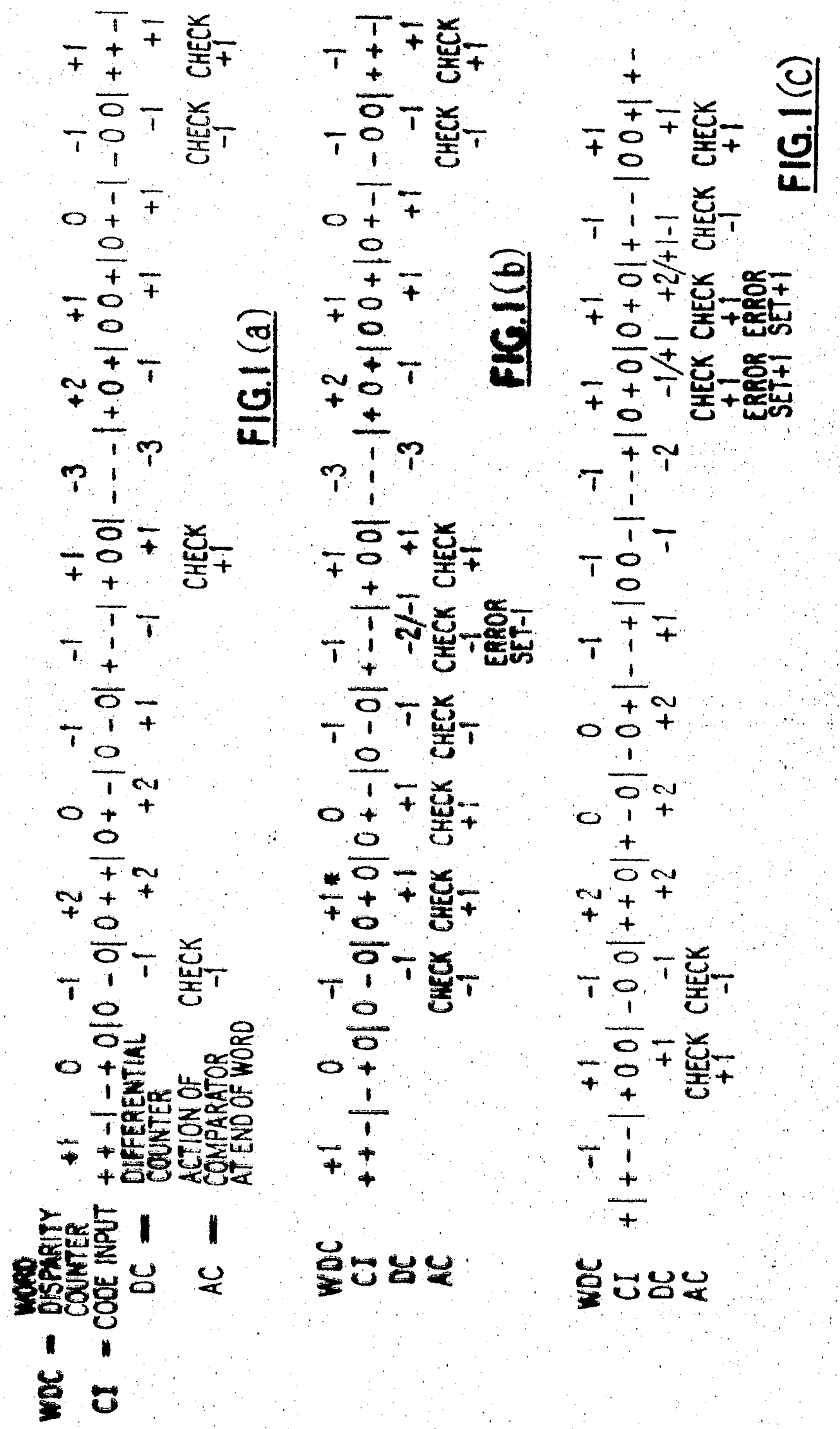
FIGS. 1(a), 1(b) and 1(c) illustrate, respectively, a correctly received restricted disparity ternary code, the same code with a digital error and the same code with a loss of synchronism.

Certain ternary code group sequences enable the line disparity to be determined uniquely. Such a sequence is a unit disparity word of one sign followed by a unit disparity word of the opposite sign. For example, if a word with disparity +1 is received, the accumulated disparity at the beginning of the word must have been negative (or −1 would have been sent) and the disparity at the end of the word cannot be more positive than +1. If a −1 disparity word is now received, the accumulated disparity at the beginning of the word must have been positive and was in fact +1 and so at the end of the word it is −1. Zero disparity words occurring between the two unit disparity words do not effect this argument. Hence, we can say that two successive unit disparity words of opposite sign enable us to set the differential counter to 1 with the sign of the last unit disparity word. Assuming that the receiver is in correct synchronism, it can be seen that, in the absence of digital errors, the differential counter will agree with this check every time it occurs, see FIG. 1(a) for a typical sequence. However, every single error between checks will cause the next check to fail, so will all groups of errors which change the accumulated disparity. Thus, to monitor digital errors, it is necessary to detect suitable sequences of input words which enable the differential counter state to be defined, then to compare the expected state of the differential counter with its actual state, and, if these differ, to set the differential counter to the expected state while giving an error output. These checks occur very frequently. This technique can be used for error monitoring, irrespective of the method used to find word synchronism. FIG. 1(b) shows the sequence of FIG. 1(a) with detection of a digital error.

If the above checks are carried out when the receive translator is out of synchronism, the check fails frequently, once every eight words in a typical ternary stream. Moreover, this condition will persist for as long as the out-of-synchronism condition persists. Thus, we can distinguish between digital errors and loss of synchronism by the rate and duration of the errors caused by the out-of-synchronism condition. FIG. 1(c) shows the sequence of FIG. 1(a) with errors occurring due to the out-of-synchronism conditions.

Figure 2:
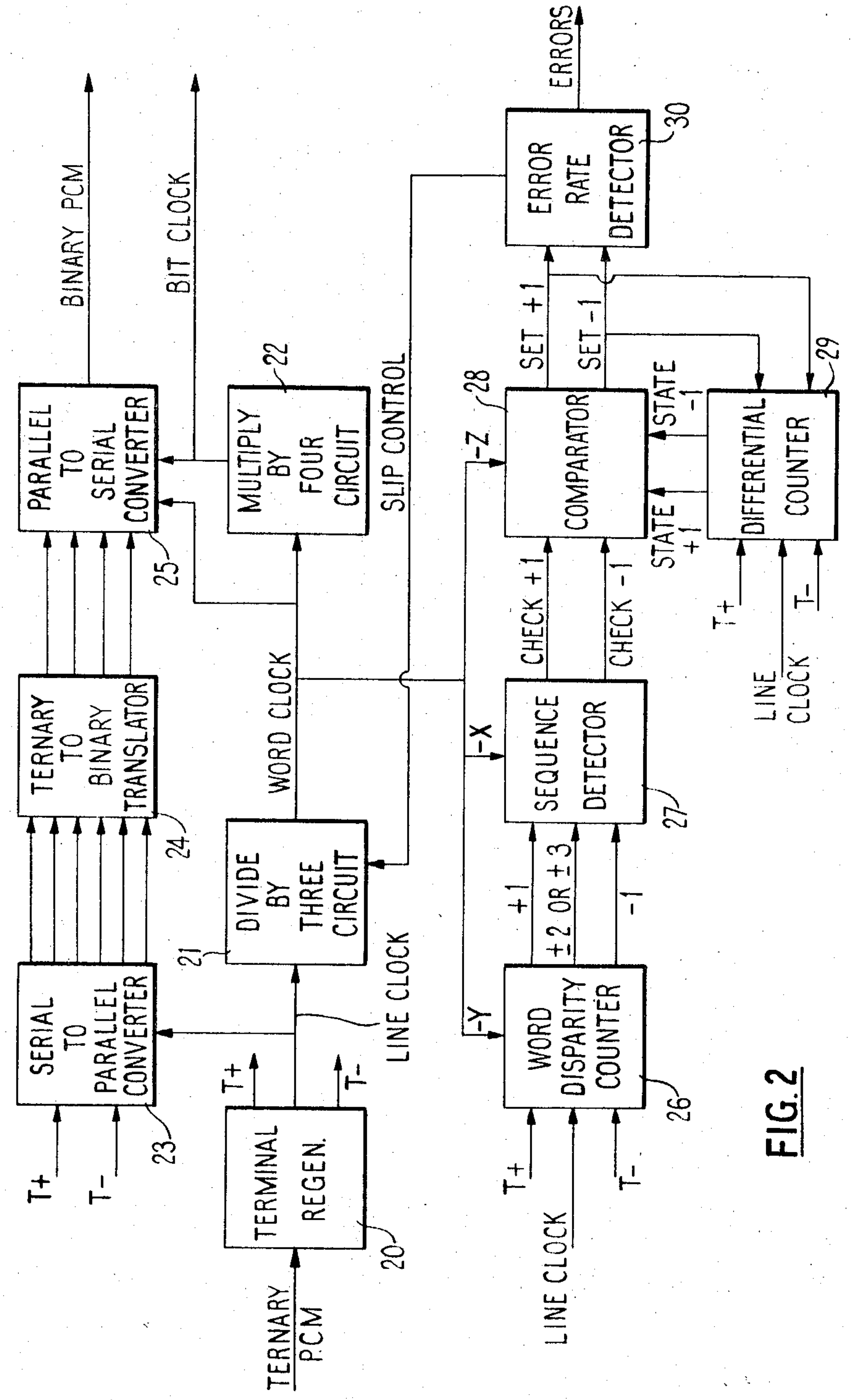
FIG. 2 is a block diagram of the main components of a receive terminal including code translation equipment and an error detection and correction system for use therewith in accordance with the principles of the present invention.

FIG. 2 shows the basic elements of a received terminal translator in which restricted disparity ternary codes received from line are converted into four-bit binary codes.

The inputs from terminal regenerator 20 are the line rate clock and the ternary code as represented by two binary streams T+ and T–. The line rate clock is divided by three in clock divide circuit 21 to define the ternary digit periods and multiplied by four in multiplier circuit 22 to give a bit rate clock to drive the output shift register (parallel-to-serial converter 25) and the succeeding equipment. The binary streams T+, T– are put into the input shift register (serial-to-parallel converter 23) and the parallel outputs therefrom are applied to ternary-to-binary translator 24 which provides binary digits in parallel. Once every word the correct binary output appears and is loaded into the parallel-to-serial converter 25 from which the serial binary stream is delivered.

The T+ and T– outputs of regenerator 20 are also fed to word disparity counter 26 which is reset at the beginning of every word and at the end of the word gives appropriate outputs if the word disparity is +1, –1 or ±2 or ±3. These outputs are stored in the sequence detector 27 and gated to give a CHECK +1 output for –1 disparity followed by +1 disparity and CHECK –1 for +1 disparity followed by –1 disparity. A ±2 or ±3 input to detector 27 terminates a sequence. These CHECK outputs are fed to comparator 28. An eight state (three stage) differential counter 29 driven from the T+ and T– outputs of regenerator 20 is identical to the transmit counter. The state of this counter is also fed to comparator 28. If a CHECK +1 input is received by comparator 28 and the accumulated disparity, according to differential counter 29, is +1 then no further action is taken. If, however, the state of counter 29 is not +1, then counter 29 is set to +1 by an output on the SET +1 output line of comparator 28. A similar process is performed for the CHECK –1. The SET pulses are combined in a NAND gate in error rate detector 30 to give a digit error indication. Detector 30 detects a given number of digit errors in a predetermined time interval before providing an error signal indicating an out-of-synchronism condition. If the error rate exceeds 16 in 4,800 words then the error signal from detector 30 causes the divide by three circuit 21 to divide by four for one cycle, thus changing the phase of circuit 21 relative to the line signal. This is repeated, if necessary, to establish the correct synchronism condition.

Figure 3:
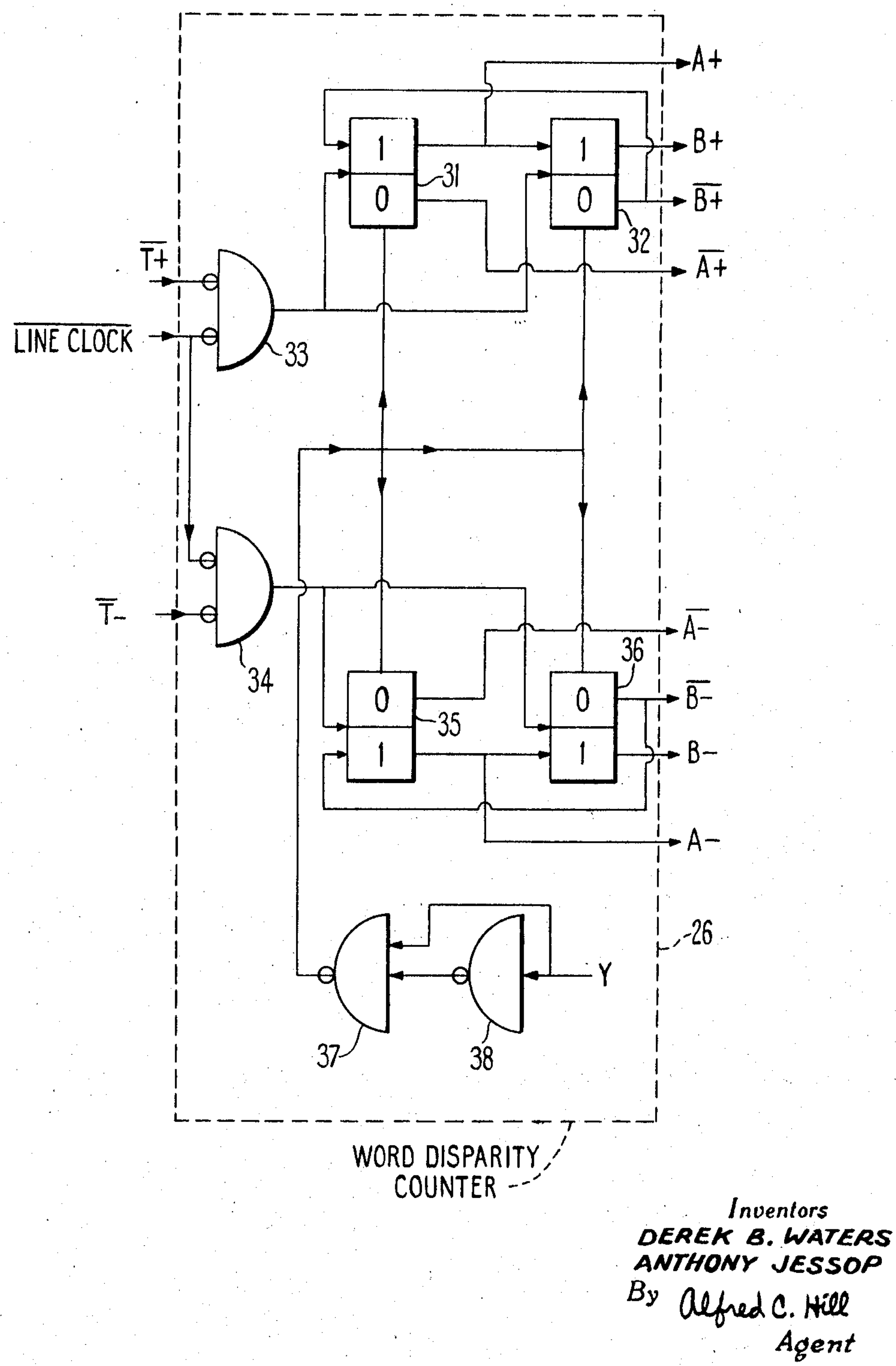
FIG. 3 is a logic diagram of the word disparity counter of FIG. 2.

The word disparity counter 26 in FIG. 2 is shown in greater detail in FIG. 3. Positive marks T+ are counted in a four-state (two stage) shift register constituted by D-flip-flops 31, 32. The $\overline{T+}$ pulses are entered into flip-flops 31, 32 via NOR-gate 33 under the control of inverted line clock pulses. Similarly the $\overline{T-}$ pulses are entered via gate NOR-34 into the shift register constituted by D-flip-flops 35, 36. NAND-gate 37 and NOT-gate 38 receive one of the outputs (output Y, FIG. 7) of the divide by three circuit 21 and provide pulses for clearing flip-flops 31, 32, 35, 36 at the end of each word.

Figure 4:
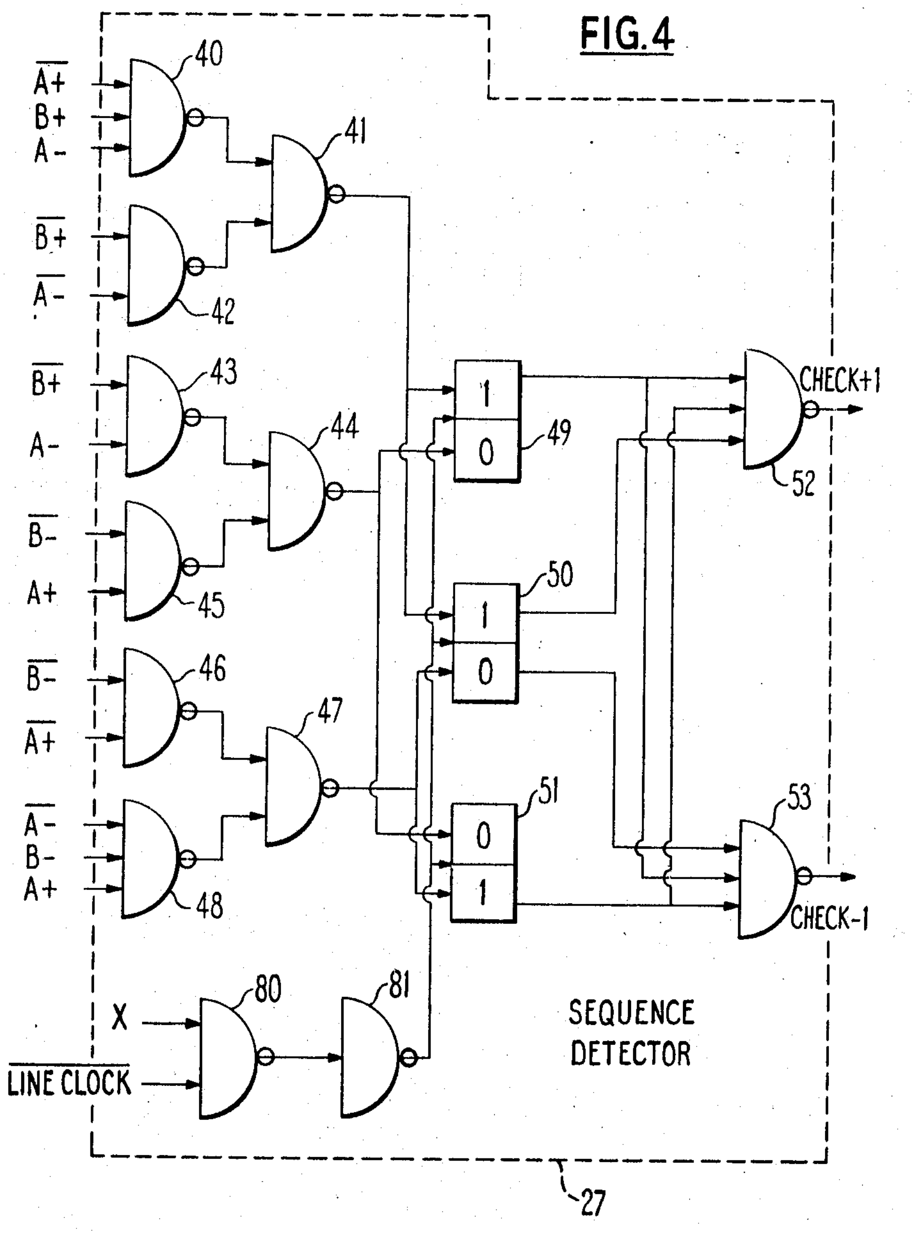
FIG. 4 is a logic diagram of the sequence detector of FIG. 2.

The sequence detector 27 of FIG. 2 is shown in FIG. 4. NAND-gates 40 to 48 are responsive to all the possible different disparity counts at the outputs of flip-flops 31, 32, 35, 36 to determine the overall disparity and disparity polarity of each ternary code group. NAND-gates 40 to 48 give logical "1" outputs as follows. For two positive and one negative marks, or 1 positive and 0 negative marks, the +1 output from NAND-gate 41 equals "1". For two negative and one positive marks, or one negative and zero positive marks, the –1 output from NAND-gate 47 equals "1". For two positive and zero negative marks, or two negative and zero positive marks, the ±2 or ±3 outputs from NAND-gate 44 equal "1". The JK-flip-flops 49–51 are clocked at the end of the word by the output of NAND-gate 80 and NOT-gate 81. NAND-gate 80 is driven by the output X of circuit 21, FIG. 7 and the inverted line clock. Flip-flop 49 has output $Q$=1 if a +1 word has been received and stored therein and flip-flop 51 has $Q$=1 if a –1 word has been received and stored therein. Both flip-flops 49, 51 are set to $Q$=0 if ±2 or ±3 word is received.

Flip-flop 50 indicates the sign of the last disparity word received and stored therein. When flip-flops 49 and 51 have $Q$=1 a CHECK +1 or CHECK –1 output is delivered from one of NAND-gates 52 or 53 according to the state of flip-flop 50.

Figure 5:
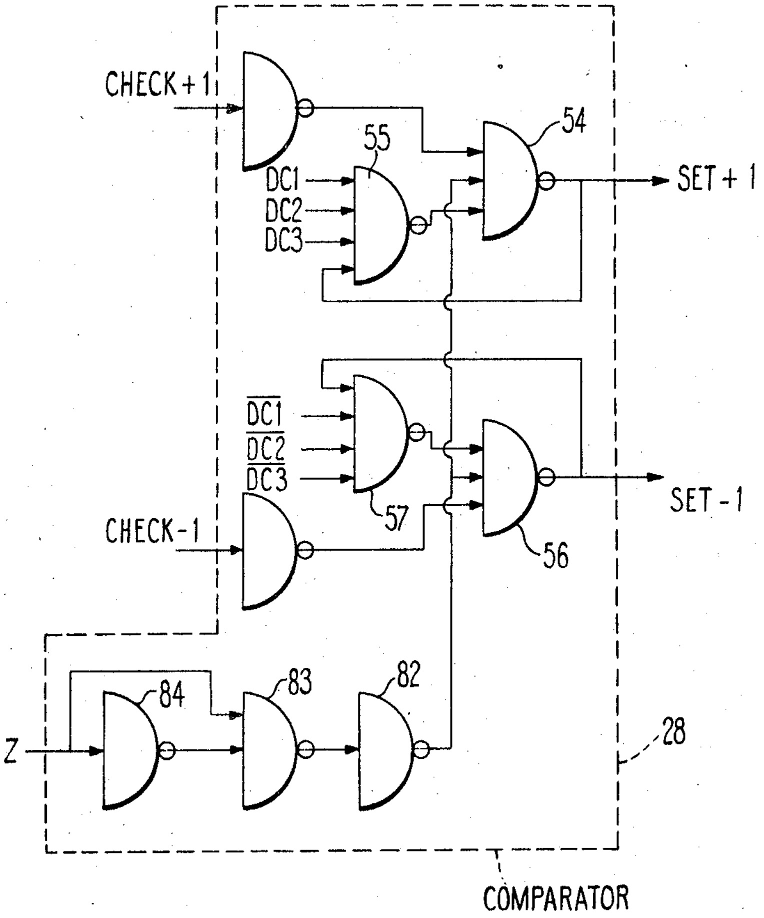
FIG. 5 is a logic diagram of the comparator of FIG. 2.

The outputs of NAND-gates 52 and 53 are applied to comparator 28 of FIG. 2, shown in greater detail in FIG. 5. Consider first the generation of a SET +1 signal from NAND-gates 54 and 55. These are cross-coupled, and the inputs DC1, DC2, DC3 of NAND-gate 55 will all be "1" only if differential counter 29 of FIG. 2 is in the +1 state. The detailed operation of counter 29 will be described below with reference to FIG. 6. If one of these outputs is "0", when the strobe pulse is "1", as provided by NOT-gate 82 driven by the output of NAND-gate 83 which, in turn, is driven by the output of NOT-gate 84 and the output Z of circuit 21, FIG. 7, then the output of NAND-gate 54 will go to "0", thus, setting the counter to the +1 state. Because of the cross-coupling of the gates the SET +1 pulse will last for the length of the strobe pulse. NAND-gates 56 and 57 operate in a similar manner for the SET –1 side. The SET lines are combined in NAND-gate 58, FIG. 7, to give digit error pulse.

Figure 6:
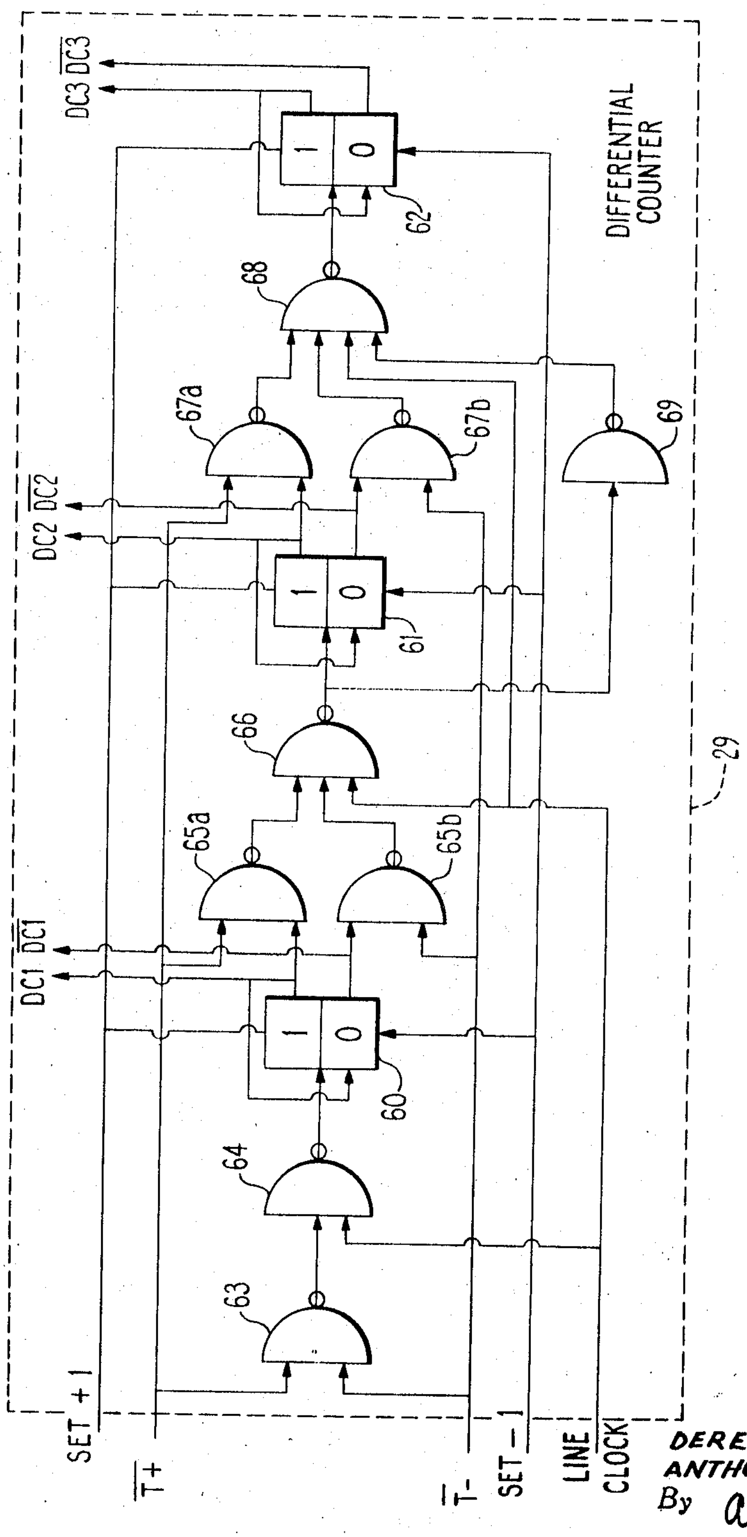
FIG. 6 is a logic diagram of the differential counter of FIG. 2.

Differential counter 29 which counts the accumulated disparity of the incoming line signals is shown in FIG. 6. This is a conventional three-stage reversible synchronous counter constituted by three D-flip-flops 60, 61 and 62. When T+ is "1", counter 29 counts in a positive direction and when T– is "1", it counts in a negative direction. When both T+ and T– are "0", counter 29 does not change state. Both $\overline{T+}$ and $\overline{T-}$ pulses are applied to the first stage via NAND-gate 63 and are clocked into flip-flop 60 by the line bit rate clock applied to NAND-gate 64. $\overline{T}$+ pulses are applied to flip-flop 61 via NAND-gate 65*a* together with the output of flip-flop 60, and are clocked in NAND-gate 66. $\overline{T}$– pulses are similarly dealt with via NAND-gates 65*b* and 66. The same procedures are followed for the third stage with NAND-gates 67*a*, 67*b* and 68. NAND-gate 69 is required to ensure that the last stage of counter 29 counts by eight and not by five.

The SET +1 input from comparator 28 is applied directly to the "1" input of flip-flops 60, 61, 62 and the SET –1 input from comparator 28 is applied directly to the "0" input of flip-flops 60, 61, 62 so that counter 29 can be adjusted by a "1" output on the SET to adjust the counter to compensate for the difference between the output of detector 27 and the output of counters 29 and thereby correct digit errors.

Counter 29 is connected to the third stage of the input shift register forming regenerator 20 to allow for delays due to the strobing of word disparity counter 26, sequence detector 27 and comparator 28.

Figure 7:
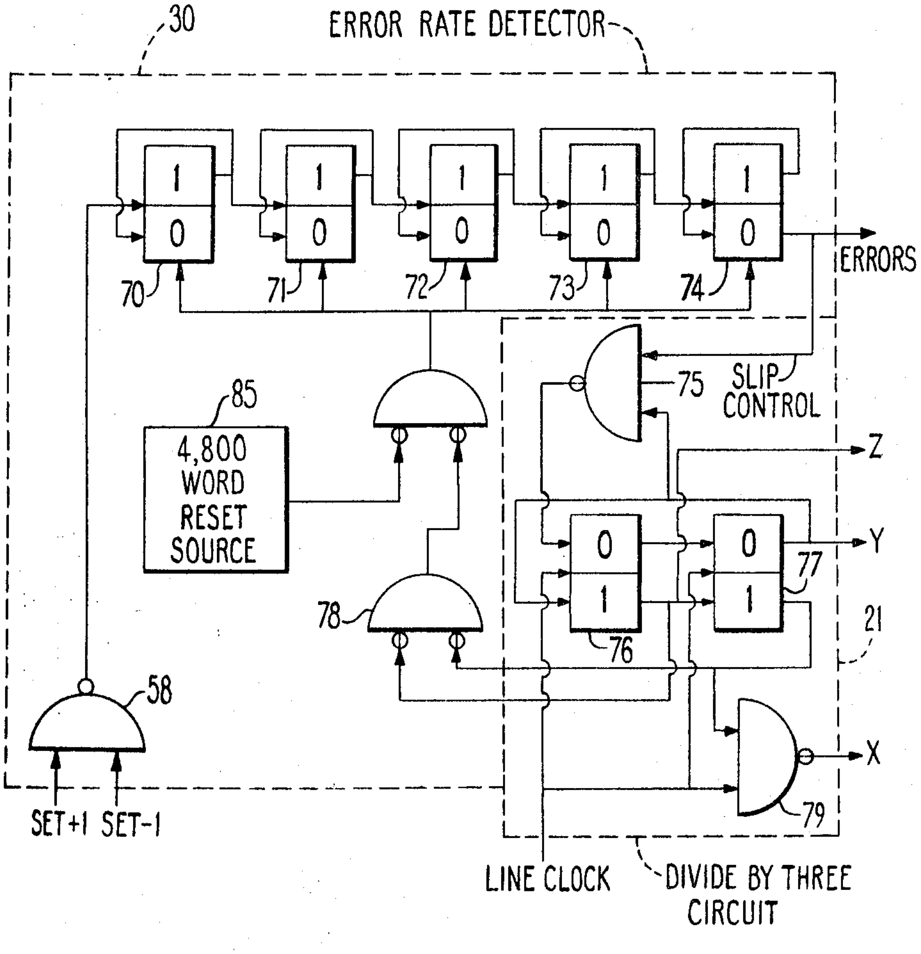
FIG. 7 is a logic diagram of the error rate detector and divide by three circuit of FIG. 2.

The error rate detector 30 of FIG. 2 is shown in detail in FIG. 7 and consists basically of a five-stage ripple count constituted by a series of five D-flip-flops 70–74, the last stage of which indicates the out-of-synchronism condition. The counter is reset every 4,800 words by source 85 to clear line or digit errors. If 16 digit errors are received from NAND-gate 58 between reset pulses from source 85 then the last flip-flop 74 changes state to indicate an out-of-synchronism condition and opens NAND-gate 75 which makes the divide-by-three circuit 21 divide by four. The divide-by-three circuit 21 consists of two JK-flip-flops 76, 77, the fourth state of which is detected by NOR-gate 78. When NOR-gate 78 is opened, a reset pulse is applied to the digital error rate counter, thus, resetting the counter even though the 4,800 word period is not completed. The momentary alteration of the line clock division causes the word clock rate to slip by one bit. This resetting via gate 78 should enable the error rate counter to regain synchronism because of the slip introduced into the word rate clock. If the resetting of the error rate counter does not achieve synchronism, then after another 16 errors are detected, the error state counter is reset again and a further one-bit slip introduced into the word rate clock. The slip control signal and the error signal indicating loss of synchronism is present at the "0" output of flip-flop 74. The line bit rate clock triggers flip-flops 76 and 77 and clocks NAND-gate 79 to produce the output X. Output Y is derived from the "0" output of flip-flop 77 and output Z is derived from the "1" output of flip-flop 76. Each of output X, Y and Z has a rate 1/3 of the input line clock rate. These outputs have different phases corresponding to three successive pulses of the input line clock and are used to control the operation of sequence detector 27, word disparity counter 26 and comparator 28, respectively, and produce the word clock.

While I have described above the principles of my invention in connection with specific apparatus, it is to be clearly understood that this description is made only by way of example and not as a limitation to the scope of my invention as set forth in the objects thereof and in the accompanying claims.

We claim:

1. In a restricted disparity ternary code signal translator, an error detection system comprising:
- a source of a stream of said ternary code signals;
- first means coupled to said source for detecting in said stream the disparity characteristics of sequences of consecutive ternary code groups which should contain predetermined disparity characteristics;
- second means coupled to said source for computing the expected disparity characteristics of said sequences;
- third means coupled to said first and second means for comparing said detected disparity characteristics with said expected disparity characteristics and producing a control signal in response to a difference between said detected and said expected disparity characteristics to adjust said second means to compensate for said difference; and
- fourth means coupled to said third means responsive to said control signals to produce an error signal.

2. A system according to claim 1, wherein said first means includes
- fifth means coupled to said source for counting separately the digits of each disparity occurring in a ternary code group,
- first logic means coupled to said fifth means responsive to the possible different combinations of disparity counts to determine the overall disparity and disparity polarity of each ternary code group,
- sixth means coupled to said first logic means for storing said overall disparity and said disparity polarity,
- seventh means coupled to said first logic means for storing the disparity polarity of the preceding ternary code group, and
- second logic means coupled to said sixth and seventh means responsive to the state of said sixth and seventh means to deliver two signals, one signal indicating said detected disparity characteristic of one polarity and the other signal indicating said detected disparity characteristic of a polarity opposite said one polarity, the one of said two signals delivered being determined by the relative states of said sixth and seventh means.

3. A system according to claim 1, wherein said second means includes
- a differential digital counter coupled to said source to count the digits of said streams, the count of said counter being increased for digits of one disparity polarity and the count of said counter being decreased for digits of disparity polarity opposite said one polarity, and
- eighth means coupled to said third means and said counter to alter the count of said counter in response to said control signal.

4. A system according to claim 1, wherein said third means includes
- third logic means coupled to said first and second means responsive to the output signal of said first means and the output signal of said second means to separately generate, as said control signal, two output signals, the one of said two output signals generated being determined by the nature of the difference between the output signal of said first means and the output signal of said second means.

5. A system according to claim 1, wherein said first means includes
- fifth means coupled to said source for counting separately the digits of each disparity occurring in a ternary code group,
- first logic means coupled to said fifth means responsive to the possible different combinations of disparity counts to determine the overall disparity and disparity polarity of each ternary code group,
- sixth means coupled to said first logic means for storing said overall disparity and said disparity polarity,
- seventh means coupled to said first logic means for storing the disparity polarity of the preceding ternary code group, and
- second logic means coupled to said sixth and seventh means responsive to the state of said sixth and seventh means to deliver two signals, one signal indicating said detected disparity characteristic of one polarity and the other signal indicating said detected disparity characteristic of a polarity opposite said one polarity, the one of said two signals delivered being determined by the relative states of said sixth and seventh means; and said second means includes
- a differential digital counter coupled to said source to count the digits of said streams, the count of said counter being increased for digits of one disparity polarity and the count of said counter being decreased for digits of disparity polarity opposite said one polarity, and
- eighth means coupled to said third means and said counter to alter the count of said counter in response to said control signal.

6. A system according to claim 1, wherein said second means includes
- a differential digital counter coupled to said source to count the digits of said streams, the count of said counter being increased for digits of one disparity polarity and the count of said counter being decreased for digits of disparity polarity opposite said one polarity, and
- eighth means coupled to said third means and said counter to alter the count of said counter in response to said control signal; and said third means includes
- third logic means coupled to said first means and said counter responsive to the output signal of said first means and the output signals of said counter to separately generate, as said control signal, two output signals, the one of said two output signals generated being determined by the nature of the difference between the output signal of said first means and the output signals of said counter.

7. A system according to claim 1, wherein said first means includes fifth means coupled to said source for counting separately the digits of each disparity occurring in a ternary code group, first logic means coupled to said fifth means responsive to the possible different combinations of disparity counts to determine the overall disparity and disparity polarity of each ternary code group, sixth means coupled to said first logic means for storing said overall disparity and said disparity polarity, seventh means coupled to said first logic means for storing the disparity polarity of the preceding ternary code group, and second logic means coupled to said sixth and seventh means responsive to the state of said sixth and seventh means to delivery two signals, one signal indicating said detected disparity characteristic of one polarity and the other signal indicating said detected disparity characteristic of a polarity opposite said one polarity, the one of said two signals delivered being determined by the relative states of said sixth and seventh means; and said third means includes third logic means coupled to said second logic means and said second means responsive to said two signals of said second logic means and the output signal of said second means to separately generate, as said control signal, two output signals, the one of said two output signals generated being determined by the nature of the difference between said two signals of said second logic means and the output signal of said second means.

8. A system according to claim 1, wherein said first means includes fifth means coupled to said source for counting separately the digits of each disparity occurring in a ternary code group, first logic means coupled to said fifth means responsive to the possible different combinations of disparity counts to determine the overall disparity and disparity polarity of each ternary code group, sixth means coupled to said first logic means for storing said overall disparity and said disparity polarity, seventh means coupled to said first logic means for storing the disparity polarity of the preceding ternary code group, and second logic means coupled to said sixth and seventh means responsive to the state of said sixth and seventh means to deliver two signals, one signal indicating said detected disparity characteristic of one polarity and the other signal indicating said detected disparity characteristic of a polarity opposite said one polarity, the one of said two signals delivered being determined by the relative states of said sixth and seventh means; and said second means includes a differential digital counter coupled to said source to count the digits of said streams, the count of said counter being increased for digits of one disparity polarity and the count of said counter being decreased for digits of disparity polarity opposite said one polarity, and eighth means coupled to said third means and said counter to alter the count of said counter in response to said control signal; and said third means includes third logic means coupled to said logic means, said counter and said eighth means responsive to said two signals of said second logic means and the output signals of said counter to separately generate, as said control signal, two output signals for coupling to said eighth means, the one of said two output signals generated being determined by the nature of the difference between said two signals of said second logic means and the output signals of said counter.

9. A system according to claim 1, further including fifth means coupled to said fourth means responsive to a predetermined number of said error signals within a predetermined time interval to detect an-out-of-synchronism condition and produce a correction signal.

10. A system according to claim 9, further including a timing signal generator coupled to said source and said fifth means to control the operation of said translator, said timing signal generator being responsive to said correction signal to adjust the operation of said timing signal generator to achieve synchronism.

* * * * *